(12) United States Patent
Ichimura

(10) Patent No.: US 11,835,692 B2
(45) Date of Patent: Dec. 5, 2023

(54) OPTICAL SYSTEM AND IMAGE PICKUP APPARATUS HAVING THE SAME

(71) Applicant: CANON KABUSHIKI KAISHA, Tokyo (JP)

(72) Inventor: Junya Ichimura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 399 days.

(21) Appl. No.: 17/174,832

(22) Filed: Feb. 12, 2021

(65) Prior Publication Data
US 2021/0263286 A1    Aug. 26, 2021

(30) Foreign Application Priority Data

Feb. 21, 2020  (JP) .................................. 2020-027795

(51) Int. Cl.
  *G02B 13/00*  (2006.01)
  *G02B 9/62*   (2006.01)
  *G02B 9/08*   (2006.01)
(52) U.S. Cl.
  CPC ........... *G02B 13/0045* (2013.01); *G02B 9/08* (2013.01); *G02B 9/62* (2013.01); *G02B 13/006* (2013.01)
(58) Field of Classification Search
  CPC .... G02B 13/0045; G02B 9/62; G02B 13/006; G02B 9/08
  See application file for complete search history.

(56) References Cited

U.S. PATENT DOCUMENTS

| 2,986,071 | A | * | 5/1961 | Baker | ................... G02B 13/00 359/708 |
| 3,486,810 | A | * | 12/1969 | Jan | ........................ G02B 13/00 359/765 |
| 3,646,731 | A |  | 3/1972 | Hansen | |
| 4,099,843 | A |  | 7/1978 | Imai | |
| 4,773,746 | A |  | 9/1988 | Arai | |
| 5,930,056 | A |  | 7/1999 | Ohashi | |

(Continued)

FOREIGN PATENT DOCUMENTS

| CN | 101377565 A | 3/2009 |
| CN | 104317036 A | 1/2015 |

(Continued)

OTHER PUBLICATIONS

Herbert Gross et al., "Handbook of Optical Systems" vol. 3: Aberration Theory and Correction of Optical Systems, Chapter 31: Correction of Aberrations, Wiley-VCH, Jan. 1, 2007, pp. 215-221, 225.

(Continued)

*Primary Examiner* — George G. King
(74) *Attorney, Agent, or Firm* — Carter, DeLuca & Farrell LLP

(57) ABSTRACT

An optical system includes, in order from an object side to an image side, a front unit of a positive refractive power, a diaphragm, and a rear unit of a positive refractive power. The front unit includes, in order from the object side to the image side, a positive lens L11, a positive lens L12, and a negative lens L13. The rear unit includes, in order from the object side to the image side, a negative lens L21, a positive lens L22, and a positive lens L23. A predetermined condition is satisfied.

17 Claims, 4 Drawing Sheets

(56) References Cited

U.S. PATENT DOCUMENTS

| | | | |
|---|---|---|---|
| 6,101,049 A * | 8/2000 | Noda | G02B 9/62 |
| | | | 359/759 |
| 9,784,951 B2 | 10/2017 | Ichimura | |
| 10,139,606 B2 | 11/2018 | Ichimura | |
| 2006/0285227 A1* | 12/2006 | Kobayashi | G02B 13/0035 |
| | | | 359/740 |
| 2007/0229983 A1 | 10/2007 | Saori | |
| 2019/0079305 A1 | 3/2019 | Ichimura | |
| 2019/0235206 A1 | 8/2019 | Ichimura | |
| 2021/0003832 A1 | 1/2021 | Katayose et al. | |
| 2021/0157156 A1 | 5/2021 | Ichimura | |

FOREIGN PATENT DOCUMENTS

| | | | |
|---|---|---|---|
| CN | 209433112 A | 9/2019 | |
| JP | S47504 Y1 * | 2/1972 | G02B 9/60 |
| JP | S47-005404 A | 3/1972 | |
| JP | S63-155015 A | 6/1988 | |
| JP | H03156413 A | 7/1991 | |
| JP | 5-039284 B2 | 6/1993 | |
| JP | 7-151964 A | 6/1995 | |
| JP | H07-253538 A | 10/1995 | |
| JP | H09-033800 A | 2/1997 | |
| JP | 2010-072359 A | 4/2010 | |
| JP | 2016-142947 A | 8/2016 | |

OTHER PUBLICATIONS

Warren J. Smith, "Modern Lens Design" Chapter 3: Improving a Design, Genesee Optics Software, Inc., McGraw Hill, Jan. 1, 1992, pp. 25-27.

Extended European Search Report issued by the European Patent Office dated Jun. 25, 2021 in corresponding EP Patent Application No. 21157630.1.

Notification of the First Office Action issued by the China National Intellectual Property Administration dated Dec. 2, 2022 in corresponding CN Patent Application No. 202110183858.6, with English translation.

Notice of Reasons for Refusal issued by the Japanese Patent Office dated Sep. 26, 2023 in corresponding JP Patent Application No. 2020-027795, with English translation.

* cited by examiner

OPTICAL SYSTEM AND IMAGE PICKUP APPARATUS HAVING THE SAME

BACKGROUND OF THE INVENTION

Field of the Invention

The present invention relates to an optical system suitable for an image pickup apparatus, such as a digital camera and a video camera.

Description of the Related Art

Japanese Patent (Examined) Publication No. ("JP") 5-039284 describes a double Gaussian type optical system that can correct various aberrations with a small number of lenses.

However, the double Gaussian type optical system as disclosed in JP 5-039284 has difficulty in satisfactorily correcting various aberrations, such as the spherical aberration and the curvature of field, when the symmetry is broken along with the miniaturization. In particular, when the optical system has a large aperture ratio, it becomes difficult to suppress the sagittal flare and coma flare at an intermediate angle of view.

SUMMARY OF THE INVENTION

The present invention provides a compact optical system having a large aperture ratio and an image pickup apparatus having the same, each of which can provide a high optical performance.

An optical system according to one aspect of the present invention includes, in order from an object side to an image side, a front unit of a positive refractive power, a diaphragm, and a rear unit of a positive refractive power. The front unit includes, in order from the object side to the image side, a positive lens L11, a positive lens L12, and a negative lens L13. The rear unit includes, in order from the object side to the image side, a negative lens L21, a positive lens L22, and a positive lens L23. The following conditional expressions are satisfied:

$$1.00 < fF/fR < 2.00$$

$$1.00 < f22/f$$

where fF is a focal length of the front unit, fR is a focal length of the rear unit, f22 is a focal length of the positive lens L22, and f is a focal length of the optical system.

An image pickup apparatus including the above optical system also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
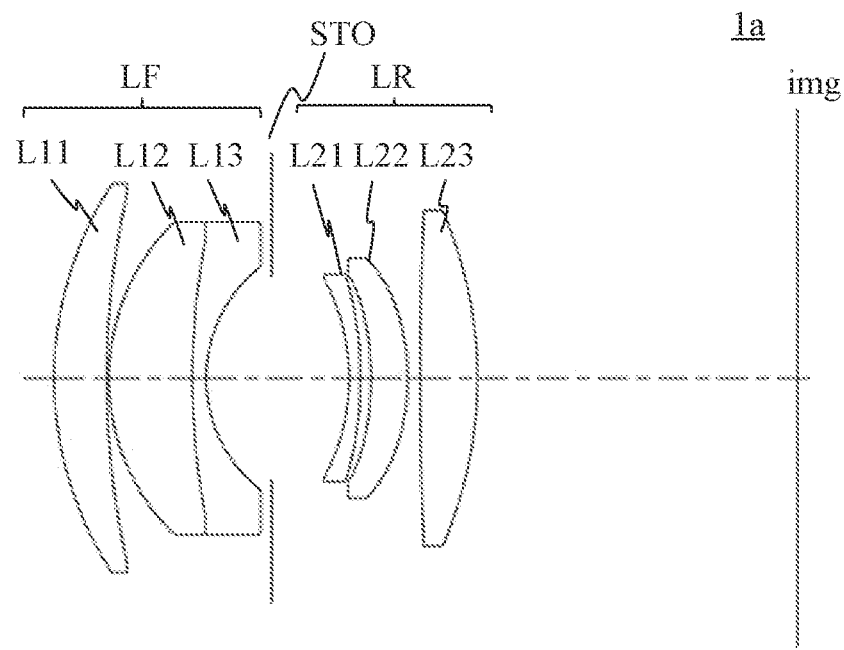
FIG. 1 is a sectional view of an optical system according to Example 1.
Figure 3:
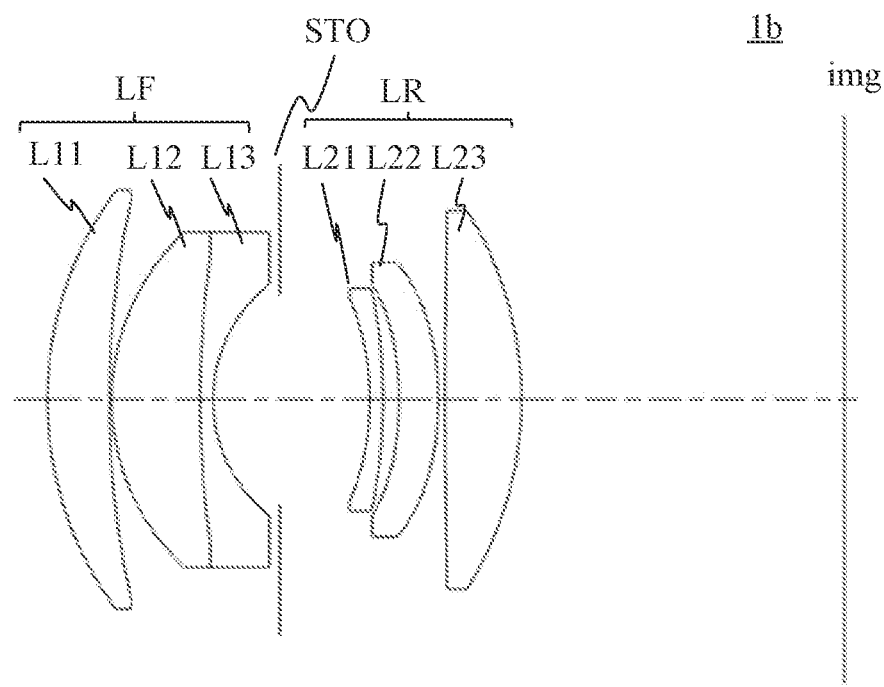
FIG. 3 is a sectional view of an optical system according to Example 2.
Figure 5:
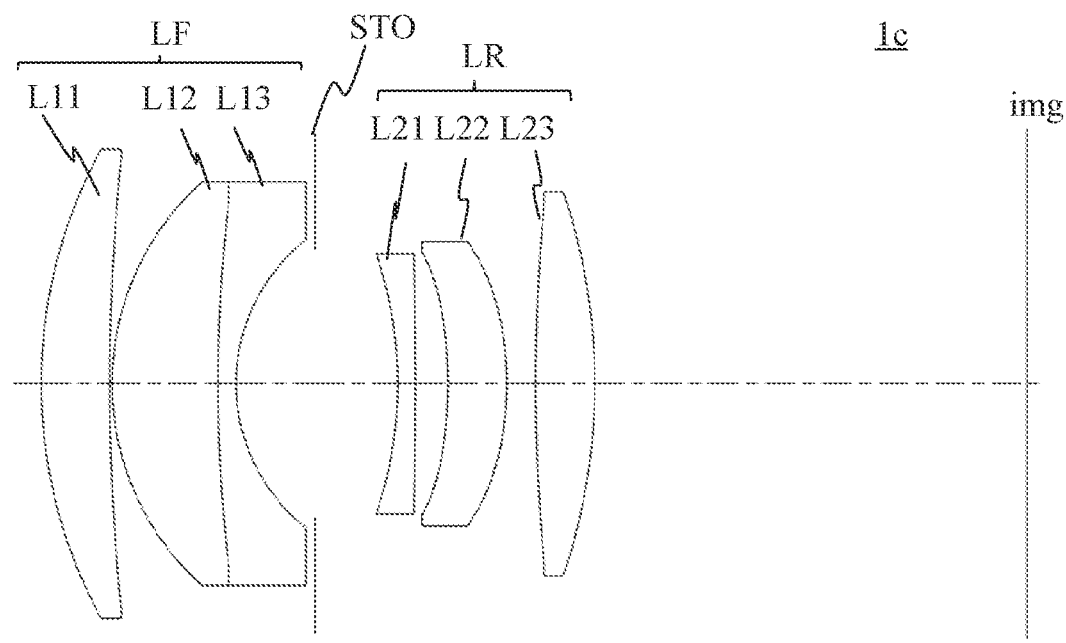
FIG. 5 is a sectional view of an optical system according to Example 3.

FIGS. 1, 3, and 5 are sectional views of optical systems (imaging optical systems) 1a to 1c according to Examples 1 to 3, respectively, with an object distance at infinity. Each of the optical systems 1a to 1c includes, in order from an object side to an image side, substantially two units including a front unit LF having a positive refractive power, an aperture stop (diaphragm) STO, and a rear unit LR having a positive refractive power. The front unit LF substantially includes, in order from the object side to the image side, three lenses including a positive lens (lens with a positive refractive power) L11, a positive lens L12, and a negative lens (lens with a negative refractive power) L13. The rear unit LR substantially includes a negative lens L21, a positive lens L22, and a positive lens L23.

The positive lens L11 is a meniscus lens that is convex on the object side, and has the largest effective diameter among the constituent lenses. The positive lens L12 is a meniscus lens that is convex on the object side, and is the thickest on the optical axis among the constituent lenses. The negative lens L13 is a meniscus lens that is convex on the object side and the closest to the aperture stop STO. The positive lens L12 and the negative lens L13 is a cemented lens cemented by an adhesive agent, and the combined refractive power is negative. The negative lens L21 is a lens concave on the object side, and has the smallest effective diameter among the constituent lenses. The absolute value of the radius of curvature of the image-side surface of the negative lens L21 is larger than the absolute value of the radius of curvature of the object-side surface of the negative lens L21. The positive lens L22 is a meniscus-shaped aspherical lens that is convex on the image side, and is made of a resin material. The positive lens L23 has a biconvex shape with a strong curvature of the surface on the image side. The radius of curvature of the surface on the object side of the positive lens L23 is larger than that of the surface on the image side of the positive lens L23.

Figure 2:
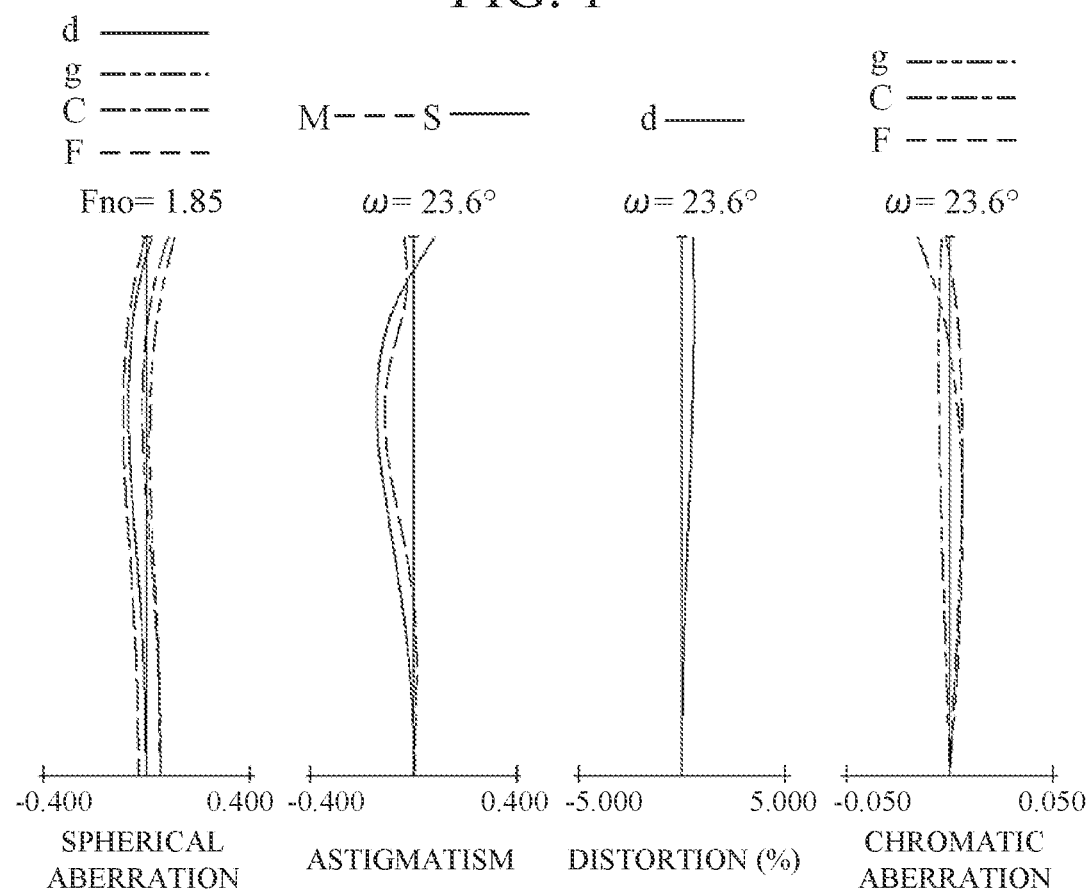
FIG. 2 is an aberration diagram of the optical system according to Example 1.
Figure 4:
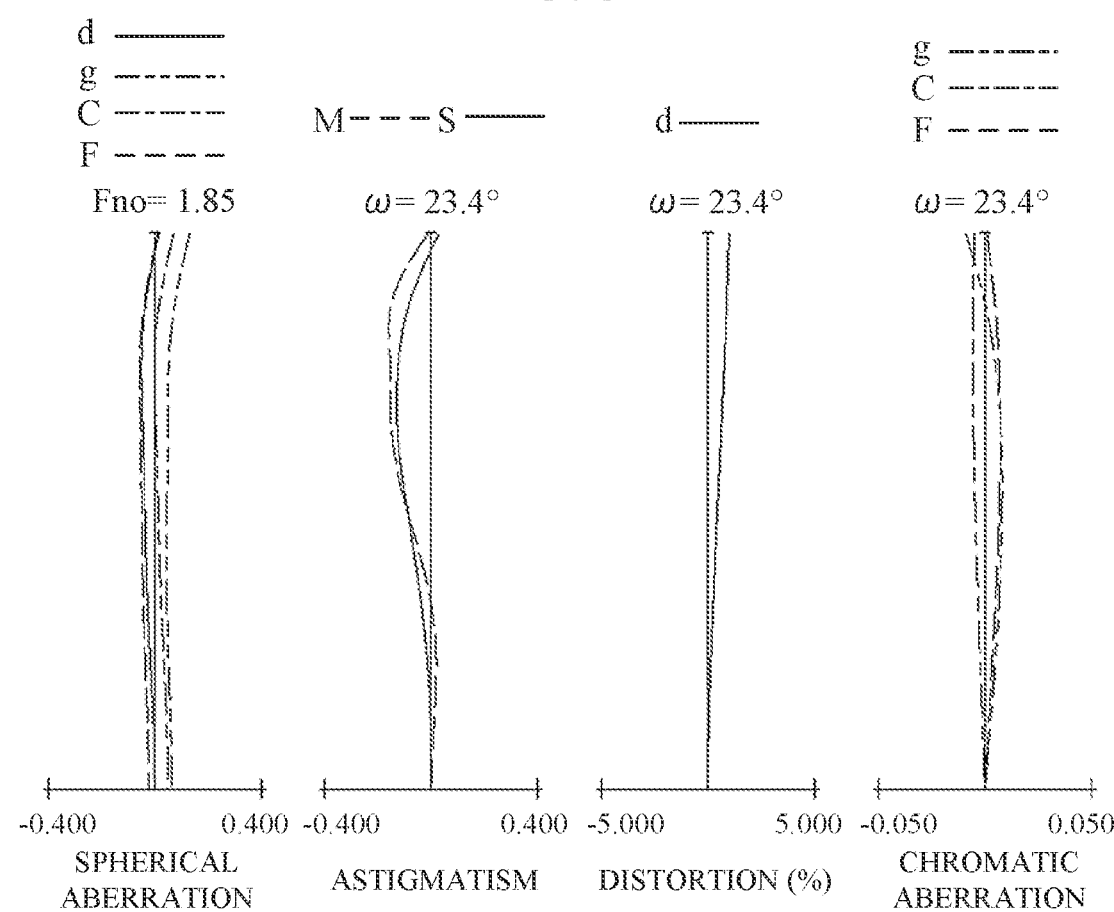
FIG. 4 is an aberration diagram of the optical system according to Example 2.
Figure 6:
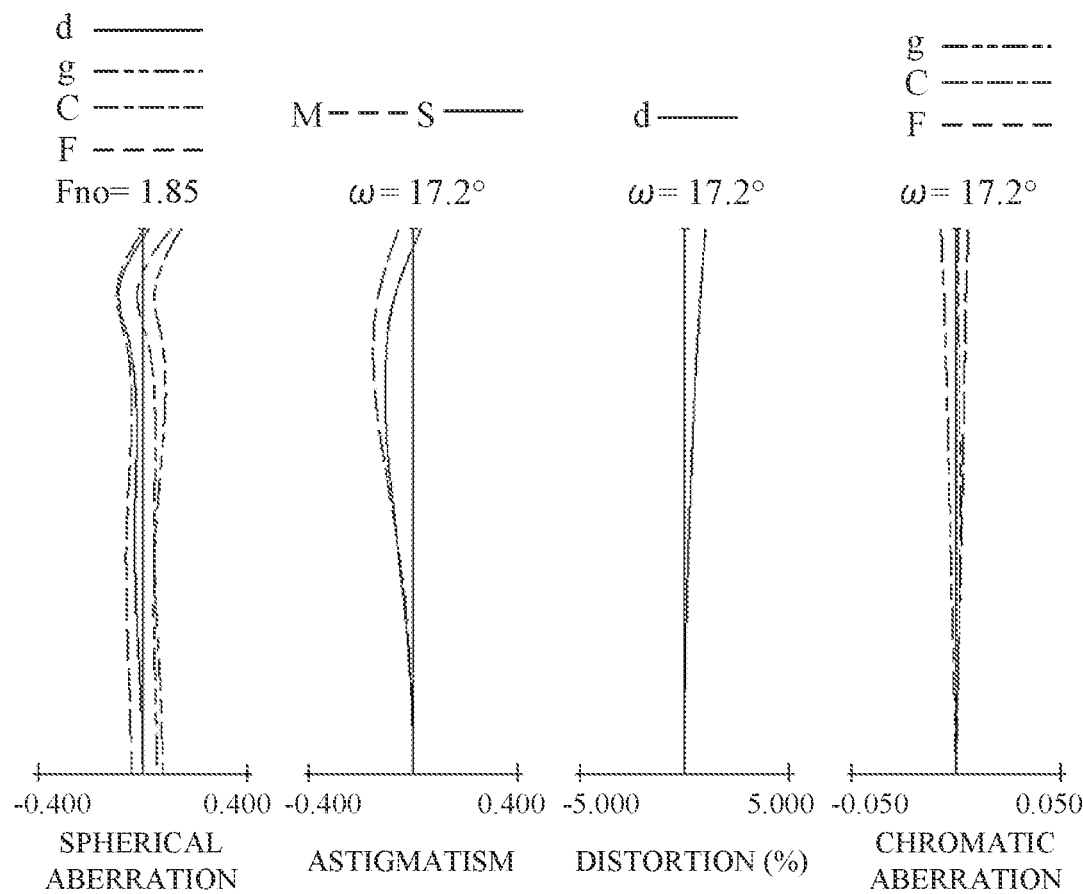
FIG. 6 is an aberration diagram of the optical system according to Example 3.

FIGS. 2, 4, and 6 are aberration diagrams showing the imaging performance of the optical systems 1a to 1c, respectively, with an object distance at infinity. The spherical aberration, the astigmatism, the distortion, and the chromatic aberration are shown in order from the left side, respectively. In terms of the spherical aberration, a solid line indicates the aberration for the d-line (587.56 nm), a broken line indicates the aberration for the F-line (486.13 nm), an alternate long and short dash line indicates the aberration for the C-line (656.27 nm), and an alternate long and short two dash lines indicates the aberration for the g-line (435.83 nm). The scale on the abscissa axis is a defocus amount, which is −0.400 to +0.400 [mm]. In the astigmatism diagram, a solid line shows the curvature of field of the sagittal image plane, and a dotted line shows the curvature of field of the meridional image plane. The abscissa axis is the same as that in the spherical aberration. In the distortion aberration, the scale on the abscissa axis is indicated by −5.000 to +5.000 [%]. The chromatic aberration indicates a shift of the lateral chromatic aberration from the d-line, and the scale on the abscissa axis is −0.050 to +0.050 [mm].

The optical systems 1a to 1c separate the rear-unit joints of the conventional six-unit double Gaussian lens, weaken the refractive power of each lens in the rear unit to reduce the curvature of field, and introduce an aspherical surface with a weak refractive power to the positive lens L22 to suppress the coma flare at an intermediate angle of view. The optical systems 1a to 1c increase the refractive power of the front unit LF across the aperture stop STO, and decrease the refractive power of the rear unit LR relative to the front unit LF. Thereby, the telephoto tendency is enhanced across the aperture stop STO, and the length from the lens surface (lens first surface) closest to the object to the image plane img in each of the optical systems 1a to 1c is shortened.

Here, the following conditional expression (1) is satisfied:

$$1.00 < fF/fR < 2.00 \quad (1)$$

where fF is a focal length of the front unit LF, and fR is a focal length of the rear unit LR.

If the value is higher than the upper limit in the conditional expression (1), the backfocus becomes too long, and it becomes difficult to shorten the overall length (overall lens length) of the optical systems 1a to 1c, or it becomes difficult to make a large aperture ratio. On the other hand, if the value is lower than the lower limit in the conditional expression (1), the negative refractive power of the front unit LF is insufficient and the curvature of field cannot be suppressed.

The rear unit LR includes a weak negative lens L21 with a strong concave surface on the object side, a weak positive lens L22 with a strong convex surface on the image side, and a positive lens L23. Here, the following conditional expression (2) is satisfied:

$$1.00 < f22/f \quad (2)$$

where f is a focal lengths of the optical systems 1a to 1c (overall system) and f22 is a focal length of the positive lens L22.

The following conditional expressions (3) and (4) may be satisfied:

$$-2.00 < f21/f < -0.50 \quad (3)$$

$$0.30 < f23/f < 1.10 \quad (4)$$

where f21 is a focal length of the negative lens L21, and f23 is a focal length of the positive lens L23.

By weakening the refractive powers of the negative lens L21 and the positive lens L22, the curvature of field is suppressed, and as illustrated in the aberration diagrams of FIGS. 2, 4 and 6, the astigmatic difference is suppressed so that the meridional section and the sagittal section can have commensurate curvatures of field. The negative and positive power arrangement can be easily made in the rear unit LR by slightly enhancing the refractive power of the positive lens L23, and the miniaturization and large aperture ratio can be easily made by moving the principal point to the object side. Since the lens diameter of the rear unit LR can be reduced by weakening the refractive powers of the negative lens L21 and the positive lens L22, the optical system can be made smaller and lighter.

If the value is higher than the upper limit in each of the conditional expressions (2) and (3), the refractive power of each lens increases, the curvature of field increases, and the influence of a biased blur and eccentric coma flare due to eccentric errors increases. On the other hand, if the value is lower than the lower limit in the conditional expression (3), the refractive power becomes too weak to correct the Petzval sum. If the value is higher than the upper limit or lower than the lower limit in the conditional expression (4), it becomes difficult to realize an optical system with a large aperture ratio or the curvature of field excessively occurs.

The positive lens L22 may be a meniscus-shaped aspherical lens (a meniscus lens having a convex surface on the image side) that is convex on the image side. This configuration can easily balance the curvature of field and the spherical aberration while reducing the coma flare at the intermediate angle of view that may occur along with the miniaturization of the optical system. Since a lens having a strong refractive power is disposed on the front side (object side) of the aperture stop STO, it is difficult to manufacture an aspherical structure. On the other hand, if a lens having a stronger refractive power than that of the positive lens L22 is disposed on the image side, the effect of correcting curvature of field is improved, but the lens diameter becomes large and manufacturing becomes difficult. The positive lens L22 may be an aspherical lens made of a resin material. Since the positive lens L22 has a structure with a suppressed refractive power, it is resistant to changes in thermal characteristic due to the resin material, and since it has a light specific gravity, it is easy to reduce the weight.

Now assume that R1a is a radius of curvature of the lens surface closest to the image plane of the front unit LF, and R2a is a radius of curvature of the lens surface closest to the object of the rear unit LR. At this time, an air lens is formed by the lens surface having the radius of curvature R1a and the lens surface having the radius of curvature R2a. The absolute value of the radius of curvature of the surface on the image side of the air lens is larger than the absolute value of the radius of curvature of the surface on the object side of the air lens (|R1a|<|R2a|), and the following conditional expression (5) may be satisfied.

$$0.08 < (R2a+R1a)/(R2a-R1a) < 0.80 \quad (5)$$

In the conventional double Gaussian type optical system, the axial ray is greatly bounced up by the strong negative curvature on the image side of the diaphragm to correct the spherical aberration, so that it is difficult to correct the sagittal flare and a large astigmatic difference occurs. On the other hand, the optical system according to each example can suppress the sagittal flare by satisfying the conditional expression (5). In each example, it becomes easy to realize a large aperture by applying the positive and negative power arrangement to the front unit LF and by increasing the curvature of the surface of the aperture stop STO closest to the object.

If the value is higher than the upper limit in the conditional expression (5), the radius of curvature R1a becomes too small (the curvature becomes too large), and the manufacturability deteriorates. On the other hand, if the value is lower than the lower limit in the conditional expression (5), the radius of curvature R2a becomes smaller (the curvature becomes larger), the shape of the air lens becomes nearly symmetric and it becomes difficult to correct the sagittal flare along with the miniaturization, similar to the conventional double Gaussian type optical system.

Assume that R1b is a radius of curvature of a lens surface on the image side of the negative lens L21, and R2b is a radius of curvature of a lens surface on the object side of the positive lens L22. Then, an air lens having a convex surface on the image side may be formed between the negative lens L21 and the positive lens L22, and the following conditional expression (6) may be satisfied.

$$(R2b+R1b)/(R2b-R1b) < -0.10 \quad (6)$$

Since the negative refractive power that tends to be insufficient by weakening the refractive power of the negative lens L21 can be compensated by satisfying the conditional expression (6), the Petzval sum can be maintained within an allowable range. If the value is outside the range of the conditional expression (6), the balance of the Petzval sum substantially corrected by the combination of the negative lens L21 and the positive lens L22 breaks and the curvature of field would occur.

The following conditional expression (7) may be satisfied:

$$0.30 < BF/f < 0.70 \tag{7}$$

where f is a focal length of each of the optical systems 1a to 1c, and BF is a distance from the lens surface (final lens surface) closest to the image plane of the optical systems 1a to 1c to an image plane mg on the optical axis.

The conditional expression (7) shows a balance of the backfocus relative to the focal length, and if the value is lower than the lower limit, the backfocus becomes too short and the lens diameter of the rear unit LR becomes too large. If the value is higher than the upper limit, the backfocus is too long and the desired miniaturization cannot be achieved, or the overall lens length, which is a distance from the first lens surface to the final lens surface, becomes extremely short.

The following conditional expression (8) may be satisfied $$0.60 < Lst/f < 1.00 \tag{8}$$

where f is the focal length of each of the optical systems 1a to 1c, and Lst is a distance from the aperture stop STO to the image plane img.

The conditional expression (8) represents a preferable position of the diaphragm in the lens, and if the value is higher than the upper limit, the diaphragm position moves too closer to the image plane relative to the rear principal point of the lens, and the desired miniaturization cannot be achieved. If the value is lower than the lower limit, the diaphragm position moves too closer to object, and a large aperture becomes difficult or an improvement of a peripheral light amount becomes insufficient when the aperture of the diaphragm is narrowed.

The following conditional expression (9) may be satisfied:

$$1.00 < TTL/f < 1.40 \tag{9}$$

where f is the focal length of each of the optical systems 1a to 1c, and TTL is a distance from the lens surface (first lens surface) closest to the object of the optical system to the image plane img on the optical axis.

The conditional expression (9) expresses a proper range of this configuration in the miniaturization, and if the value is higher than the upper limit, the desired miniaturization cannot be obtained. If the value is lower than the lower limit in the conditional expression (9), a large aperture becomes difficult to realize, or a sufficient imaging performance cannot be obtained.

The conventional double Gaussian type correct the off-axis coma by forming an air lens between the second lens and the third lens before the diaphragm, but when unnecessary light enters the lens a total reflection ghost caused by this air lens is likely to occur.

By reducing the overall lens length, the lens wholly becomes closer to the image plane (sensor plane) so that the total reflection ghost generated when unnecessary light enters the lens can easily reach the sensor plane. In order to avoid this problem, the positive lens L12 and the negative lens L13 may form a cemented lens.

The following conditional expression (10) may be satisfied:

$$4.50 < d12/d13 < 10.00 \tag{10}$$

where d12 is a thickness of the positive lens L12 on the optical axis and d13 is a thickness of the negative lens L13 on the optical axis.

The ghost light diffused by the adhesive pool around the cemented surface can be reduced by satisfying the condition expression (10), when the positive lens L12 and the negative lens L13 are made into a cemented lens. If the value is higher than the upper limit in the conditional expression (10), the positive lens L12 becomes too thick, which prevents the overall length from reducing, and the position of the diaphragm becomes too closer to the image plane. On the other hand, if the value is lower than the lower limit in the conditional expression (10), the ghost light of the adhesive pool is likely to occur.

The following conditional expression (11) may be satisfied:

$$0.70 < N22/N23 < 1.00 \tag{11}$$

where N22 is a refractive index of the positive lens L22, and N23 is a refractive index of the positive lens L23.

By satisfying the conditional expression (11), it becomes easy to satisfy the conditional expressions (2), (3), and (4). If the value is higher than the upper limit in the conditional expression (11), the curvature of the lens becomes unnecessarily small in order to obtain the required refractive power of the positive lens L23, and the curvature of field cannot be sufficiently corrected. On the other hand, if the value is lower than the lower limit in the conditional expression (11), the lens dispersion of the positive lens L23 becomes too large in view of the existing glass, and the lateral chromatic aberration cannot be satisfactorily corrected.

The following conditional expression (12) may be satisfied:

$$1.05 < NdF/NdR < 1.50 \tag{12}$$

where NdF is an average refractive index of the lenses constituting the front unit LF (which are the positive lenses L11 and L12 and the negative lens L13), and NdR is an average refractive index of the lenses constituting the rear unit LR (which are the negative lens L21 and the positive lenses L22 and L23).

It becomes easy to satisfy the conditional expression (1) by satisfying the conditional expression (12). If the value is higher than the upper limit in the conditional expression (12), the refractive power of the rear unit LR is too low, and a desired large aperture becomes difficult to realize. On the other hand, if the value is lower than the lower limit in the conditional expression (12), the refractive power of the front unit LF is too low, and the miniaturization becomes difficult.

The numerical ranges of the conditional expressions (1) to (12) may be set as in the following conditional expressions (1a) to (12a).

$$1.20 < fF/fR < 1.90 \tag{1a}$$

$$1.20 < f22/f \tag{2a}$$

$$-1.60 < f21/f < -0.60 \tag{3a}$$

$$0.40 < f23/f < 1.00 \tag{4a}$$

$$0.12 < (R2a+R1a)/(R2a-R1a) < 0.60 \tag{5a}$$

$$(R2b+R1b)/(R2b-R1b) < -0.50 \tag{6a}$$

$$0.35 < BF/f < 0.65 \tag{7a}$$

$$0.65 < Lst/f < 0.95 \tag{8a}$$

$1.05 < TTL/f < 1.35$ (9a)

$5.00 < d12/d13 < 8.00$ (10a)

$0.75 < N22/N23 < 0.95$ (11a)

$1.06 < NdF/NdR < 1.30$ (12a)

The numerical ranges of the conditional expressions (1) to (12) may be set as in the following conditional expressions (1b) to (12b):

$1.50 < fF/fR < 1.80$ (1b)

$1.50 < f22/f$ (2b)

$-1.30 < f21/f < -0.70$ (3b)

$0.50 < f23/f < 0.90$ (4b)

$0.15 < (R2a+R1a)/(R2a-R1a) < 0.40$ (5b)

$(R2b+R1b)/(R2b-R1b) < -1.00$ (6b)

$0.45 < BF/f < 0.60$ (7b)

$0.70 < Lst/f < 0.90$ (8b)

$1.10 < TTL/f < 1.30$ (9b)

$5.5 < d12/d13 < 7.0$ (10b)

$0.80 < N22/N23 < 0.90$ (11b)

$1.06 < NdF/NdR < 1.20$ (12b)

Each of the optical systems 1a to 1c can provide focusing in response to a change of the object distance by simultaneously feeding the front unit LF, the aperture stop STO, and the rear unit LR, and can obtain a sufficient optical performance from an object distance at infinity to an imaging magnification of up to about 0.2 times.

A description will be given of Numerical Examples 1 to 3 corresponding to Examples 1 to 3. In surface data of each numerical example, r represents a radius of curvature of each optical surface, and d (mm) represents an axial distance (distance on the optical axis) between an m-th surface and an (m+1)-th surface, where m is the number of a surface counted from the light incident side (object side). Further, nd represents a refractive index of each optical element for the d-line, and vd represents an Abbe number of the optical element. An Abbe number vd of a certain material is defined as follows:

$vd = (Nd-1)/(NF-NC)$ where Nd, NF, and NC are refractive indexes of the d-line (587.6 nm), F-line (486.1 nm), and C-line (656.3 nm) in the Fraunhofer line.

In each numerical example, d, focal length (mm), F-number, and half angle of view (°) are values when the optical system according to each example focuses on an object at infinity. A backfocus (BF) is a distance on the optical axis from the final lens surface (the lens surface closest to the image plane) to the paraxial image plane in terms of the air equivalent length. The overall lens length is a length obtained by adding the backfocus to the distance on the optical axis from the first lens surface (the lens surface closest to the object) in the optical system to the final lens surface.

If the optical surface is an aspherical surface, a sign * is attached to the right side of the surface number. The aspherical shape is defined as follows:

$$x = (h^2/R)/[1+\{1-(1+k)(h/R)^2\}^{1/2}] + A4 \times h^4 + A6 \times h^6 + A8 \times h^8 + A10 \times h^{10} + A12 \times h^{12}$$

where x is a displacement amount from the surface vertex in the optical axis direction, h is a height from the optical axis in the direction orthogonal to the optical axis, R is a paraxial radius of curvature, k is a conical constant, A4, A6, A8, A10, and A12 are aspherical coefficients of each order. In addition, "e±XX" in each aspheric al coefficient means "$\times 10^{\pm XX}$".

Table 1 shows various values including the numerical values of each conditional expression in each numerical example.

| NUMERICAL EXAMPLE 1 UNIT mm Surface data | | | | | |
|---|---|---|---|---|---|
| Surface number | r | d | nd | vd | Effective Diameter |
| 1 | 28.621 | 4.20 | 1.83481 | 42.7 | 29.99 |
| 2 | 68.136 | 0.18 | | | 28.48 |
| 3 | 17.772 | 6.70 | 1.79952 | 42.2 | 23.90 |
| 4 | 59.525 | 1.10 | 1.80518 | 25.4 | 20.78 |
| 5 | 11.427 | 5.27 | | | 16.78 |
| 6(diaphragm) | ∞ | 6.20 | | | 16.24 |
| 7 | -16.726 | 0.90 | 1.67270 | 32.1 | 14.95 |
| 8 | -29.829 | 0.83 | | | 15.46 |
| 9* | -25.000 | 2.95 | 1.53110 | 55.9 | 15.52 |
| 10* | -18.373 | 0.98 | | | 18.14 |
| 11 | 280.004 | 4.60 | 1.73400 | 51.5 | 24.43 |
| 12 | -34.002 | (variable) | | | 25.71 |
| Image plane | ∞ | | | | |

Aspheric Data
9th Surface
K=0.00000e+000 A 4=-4.12032e-005 A 6=-2.90015e-007 A 8=-4.67119e-009 A10=7.90646e-011 A12=-9.28470e-013
10th Surface
K=0.00000e+000 A 4=-2.41619e-005 A 6=-3.29146e-007 A 8=1.91098e-010 A10=-9.28593e-013 A12=-2.29193e-013

| VARIOUS DATA | |
|---|---|
| Focal length | 49.57 |
| F-number | 1.85 |
| Half angle of view | 23.58 |
| Image height | 21.64 |
| Overall lens length | 59.59 |
| BF | 25.67 |
| Entrance pupil position | 22.51 |
| Exit pupil position | -21.30 |
| Front principal position | 19.77 |
| Rear principal position | -23.90 |

| SINGLE LENS DATA | | |
|---|---|---|
| Lens | Starting surface | Focal length |
| 1 | 1 | 56.39 |
| 2 | 3 | 29.58 |
| 3 | 4 | -17.74 |
| 4 | 7 | -58.21 |

-continued

SINGLE LENS DATA

| Lens | Starting surface | Focal length |
|---|---|---|
| 5 | 9 | 113.04 |
| 6 | 11 | 41.57 |

NUMERICAL EXAMPLE 2
UNIT mm
Surface data

| Surface number | r | d | nd | vd | Effective Diameter |
|---|---|---|---|---|---|
| 1 | 26.907 | 4.70 | 1.90525 | 35.0 | 30.58 |
| 2 | 69.548 | 0.20 | | | 29.16 |
| 3 | 17.472 | 6.70 | 1.69680 | 55.5 | 24.30 |
| 4 | 76.318 | 1.00 | 1.80518 | 25.4 | 20.87 |
| 5 | 11.232 | 5.07 | | | 16.39 |
| 6(diaphragm) | ∞ | 6.83 | | | 15.85 |
| 7 | −20.163 | 1.00 | 1.67270 | 32.1 | 14.50 |
| 8 | −40.590 | 1.20 | | | 15.76 |
| 9* | −25.730 | 3.00 | 1.53110 | 55.9 | 16.31 |
| 10* | −23.300 | 0.50 | | | 19.68 |
| 11 | 657.387 | 5.80 | 1.77250 | 49.6 | 25.92 |
| 12 | −27.082 | (variable) | | | 27.49 |
| Image plane | ∞ | | | | |

Aspheric Data
9th Surface
K=0.00000e+000 A 4=−4.67639e−005 A 6=−1.12292e−006 A 8=2.49541e−008 A10=−3.78123e−010 A12=2.13795e−012
10th Surface
K=0.00000e+000 A 4=−2.36398e−005 A 6=−6.45466e−007 A 8=9.49554e−009 A10=−9.59556e−011 A12=3.62348e−013

VARIOUS DATA

| Focal length | 50.03 |
|---|---|
| F-number | 1.85 |
| Half angle of view | 23.38 |
| Image height | 21.64 |
| Overall lens length | 60.52 |
| BF | 24.52 |
| Entrance pupil position | 23.78 |
| Exit pupil position | −26.38 |
| Front principal position | 24.62 |
| Rear principal position | −25.51 |

SINGLE LENS DATA

| Lens | Starting surface | Focal length |
|---|---|---|
| 1 | 1 | 46.07 |
| 2 | 3 | 31.07 |
| 3 | 4 | −16.47 |
| 4 | 7 | −60.76 |
| 5 | 9 | 325.23 |
| 6 | 11 | 33.79 |

NUMERICAL EXAMPLE 3
UNIT mm
Surface data

| Surface number | r | d | nd | vd | Effective Diameter |
|---|---|---|---|---|---|
| 1 | 41.334 | 5.80 | 1.80610 | 40.9 | 38.42 |
| 2 | 185.916 | 0.20 | | | 37.16 |
| 3 | 22.947 | 9.00 | 1.69680 | 55.5 | 32.87 |
| 4 | 135.554 | 1.50 | 1.80000 | 29.8 | 29.52 |
| 5 | 15.457 | 6.70 | | | 23.12 |
| 6(diaphragm) | ∞ | 7.00 | | | 22.56 |
| 7 | −34.225 | 1.50 | 1.67270 | 32.1 | 20.66 |
| 8 | −500.000 | 2.75 | | | 20.84 |
| 9* | −39.888 | 5.00 | 1.53110 | 55.9 | 20.93 |
| 10* | −27.362 | 2.45 | | | 22.87 |
| 11 | 161.836 | 5.00 | 1.76385 | 48.5 | 28.98 |
| 12 | −50.994 | (variable) | | | 31.25 |
| Image plane | ∞ | | | | |

Aspheric Data
9th Surface
K=0.00000e+000 A 4=−2.44755e−005 A 6=−1.15532e−007 A 8=4.82289e−011 A10=3.50956e−012 A12=−3.66450e−014
10th Surface
K=0.00000e+000 A 4=−1.53594e−005 A 6=−6.43135e−008 A 8=−4.65667e−011 A10=7.05869e−013 A12=−8.22743e−015

VARIOUS DATA

| Zoom ratio | 1.00 |
|---|---|
| Focal length | 70.00 |
| F-number | 1.85 |
| Half angle of view | 17.17 |
| Image height | 21.64 |
| Overall lens length | 83.52 |
| BF | 36.62 |
| d12 | 36.62 |
| Entrance pupil position | 30.36 |
| Exit pupil position | −34.15 |
| Front principal position | 31.12 |
| Rear principal position | −33.38 |

SINGLE LENS DATA

| Lens | Starting surface | Focal length |
|---|---|---|
| 1 | 1 | 64.78 |
| 2 | 3 | 38.38 |
| 3 | 4 | −21.93 |
| 4 | 7 | −54.69 |
| 5 | 9 | 144.10 |
| 6 | 11 | 51.29 |

TABLE 1

| | | Numerical Example | | |
|---|---|---|---|---|
| | | 1 | 2 | 3 |
| Focal length | f | 49.50 | 50.03 | 70.00 |
| F-number | Fno | 1.85 | 1.45 | 1.85 |
| Focal length of front unit | fF | 81.32 | 80.36 | 100.07 |
| Focal length of rear amit | fR | 48.37 | 45.89 | 71.16 |
| Overall lens length | TTL | 60.64 | 62.08 | 83.52 |
| Image height | YRI | 21.64 | 21.84 | 21.64 |
| BF | sk | 25.67 | 24.52 | 36.62 |
| Diapragm position | Lsto | 42.83 | 42.83 | 60.30 |

TABLE 1-continued

|  |  | Numerical Example | | |
|---|---|---|---|---|
|  |  | 1 | 2 | 3 |
| Conditional expression (1) | fF/fR | 1.65 | 1.75 | 1.42 |
| Conditional expression (2) | f22/f | 2.28 | 6.50 | 2.06 |
| Conditional expression (3) | f21/f | −1.18 | −1.21 | −0.78 |
| Conditional expression (4) | f23/f | 0.84 | 0.68 | 0.73 |
| Conditional expression (5) | (R2a + R1a)/(R2a − R1a) | 0.19 | 0.28 | 0.38 |
| Conditional expression (6) | (R2b + R1b)/(R2b − R1b) | −11.35 | −4.46 | −1.17 |
| Conditional expression (7) | BF/f | 0.52 | 0.49 | 0.52 |
| Conditional expression (8) | Lst/f | 0.87 | 0.86 | 0.86 |
| Conditional expression (9) | TTL/f | 1.23 | 1.24 | 1.19 |
| Conditional expression (10) | d12/d13 | 6.09 | 6.70 | 6.00 |
| Conditional expression (11) | N22/N23 | 0.88 | 0.86 | 0.87 |
| Conditional expression (12) | NoF/NoR | 1.10 | 1.09 | 1.07 |

Image Pickup Apparatus

Figure 7:
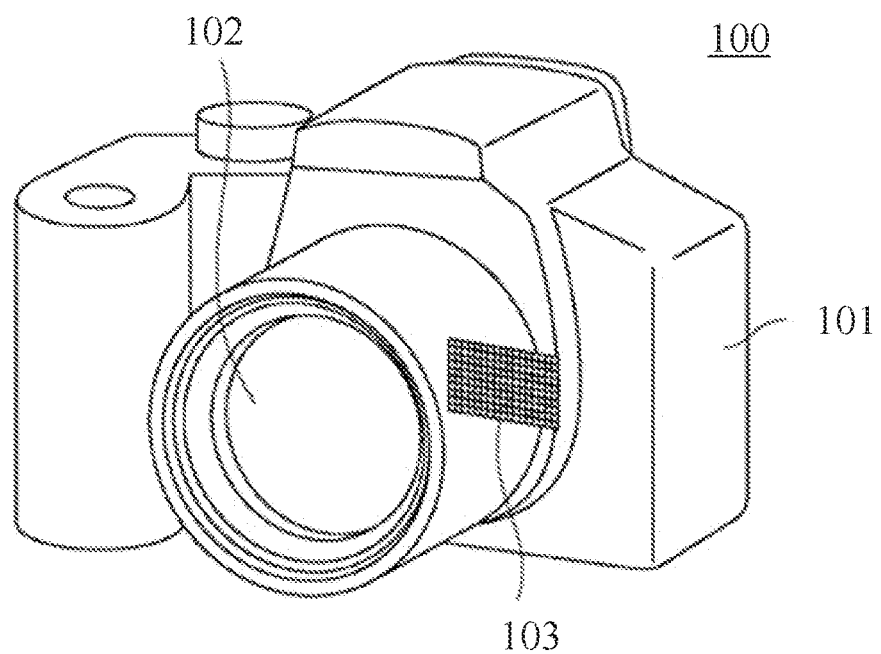
FIG. 7 is a schematic view of an image pickup apparatus according to each example.

Referring now to FIG. 7, a description will be given of a digital still camera (image pickup apparatus) 100 using the optical systems 1a to 1c according to each example as an imaging optical system. In FIG. 7, reference numeral 101 denotes a camera body, and reference numeral 102 denotes an imaging optical system (interchangeable lens) configured by any of the optical systems 1a to 1c according to Examples 1 to 3. Reference numeral 103 denotes an image sensor (photoelectric conversion element) such as a CCD sensor or a CMOS sensor, which is built in the camera body 101 and receives an optical image formed by the imaging optical system 102 and performs a photoelectric conversion. The camera body 101 may be a so-called single-lens reflex camera having a quick turn mirror, or a so-called mirrorless camera having no quick turn mirror. Each example is applicable to an image pickup apparatus in which a camera body and an imaging optical system are integrated with each other.

Each example can provide a compact, lightweight, large-aperture optical system, and an image pickup apparatus having the same.

For example, each example may use a configuration in which a lens unit having a weak refractive power is disposed on the object side or the image side of the lens, or a configuration in which a lens having a weak refractive power is disposed before the front unit LF or after the rear unit LR. The optical system according to each example can provide similar effects even if it further includes another lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-027795, filed on Feb. 21, 2020 which is hereby incorporated by reference herein in its entirety.

What is claimed is:

1. An optical system comprising, in order from an object side to an image side, a front unit of a positive refractive power, a diaphragm, and a rear unit of a positive refractive power,
   wherein the front unit includes, in order from the object side to the image side, a positive lens L11, a positive lens L12, and a negative lens L13,
   wherein the rear unit includes, in order from the object side to the image side, a negative lens L21, a positive lens L22, and a positive lens L23,
   wherein an air lens with a convex surface on the image side is formed between the negative lens L21 and the positive lens L22, and
   wherein the following conditional expressions are satisfied:

$1.00 < fF/fR < 2.00$ $1.00 < f22/f$ $(R2b + R1b)/(R2b − R1b) < −0.10$ $0.30 < BF/f < 0.60$ where fF is a focal length of the front unit, fR is a focal length of the rear unit, f22 is a focal length of the positive lens L22, f is a focal length of the optical system, R1b is a radius of curvature of a surface on the image side of the negative lens L21, R2b is a radius of curvature a surface on the object side of the positive lens L22, and BF is a distance from a lens surface closest to an image plane in the optical system to the image plane on an optical axis.

2. The optical system according to claim 1, wherein a radius of curvature of a surface on the image side of the negative lens L21 is less than that of a surface on the object side of the negative lens L21, and
   wherein the following conditional expression is satisfied:

$−2.00 < f21/f < −0.50$ where f21 is a focal length of the negative lens L21.

3. The optical system according to claim 1, wherein the positive lens L23 has a curvature on the image side larger than that on the object side, and
   wherein the following conditional expression is satisfied:

$0.30 < f23/f < 1.10$ where f23 is a focal length of the positive lens L23.

4. The optical system according to claim 1, wherein the following conditional expressions are satisfied:

$|R1a| < |R2a|$ $0.08 < (R2a + R1a)/(R2a − R1a) < 0.80$ where R1a is a radius of curvature of a lens surface closest to an image plane in the front unit, and R2a is a radius of curvature of a lens surface closest to an object in the rear unit.

5. The optical system according to claim 1, wherein the positive lens L22 is a meniscus lens with a convex surface on the image side.

6. The optical system according to claim 1, wherein the positive lens L22 includes an aspherical surface.

7. The optical system according to claim 1, wherein the following conditional expression is satisfied:

$0.60 < Lst/f < 1.00$ where Lst is a distance from the diaphragm to an image plane.

8. The optical system according to claim 1, wherein the following conditional expression is satisfied:

$1.00 < TTL/f < 1.40$ where TTL is a distance from a lens surface closest to an object in the optical system to an image plane on an optical axis.

9. The optical system according to claim 1, wherein the positive lens L12 and the negative lens L13 form a cemented lens.

10. The optical system according to claim 1, wherein the following conditional expression is satisfied:

$$4.50 < d12/d13 < 10.00$$

where d12 is a thickness of the positive lens L12 on an optical axis, and d13 is a thickness of the negative lens L13 on the optical axis.

11. The optical system according to claim 1, wherein the following conditional expression is satisfied:

$$0.70 < N22/N23 < 1.00$$

where N22 is a refractive index of the positive lens L22, and N23 is a refractive index of the positive lens L23.

12. The optical system according to claim 1, wherein the following conditional expression is satisfied:

$$1.05 < NdF/NdR < 1.50$$

where NdF is an average refractive index of lenses included in the front unit, and NdR is an average refractive index of lenses included in the rear unit.

13. The optical system according to claim 1, wherein the following conditional expressions are satisfied:

$$1.00 < f22/f \leq 6.50$$

$$-11.35 \leq (R2b-F1b)/(R2b-R1b) < -0.10$$

14. The optical system according to claim 1, wherein the front unit consists of the positive lens L11, the positive lens L12, and the negative lens L13.

15. The optical system according to claim 1, wherein the rear unit consists of the negative lens L21, the positive lens L22, and the positive lens L23.

16. The optical system according to claim 1, wherein the positive lens L12 and the negative lens L13 are cemented.

17. An image pickup apparatus comprising:
an optical system; and
an image sensor configured to receive light from the optical system,
wherein the optical system includes, in order from an object side to an image side, a front unit of a positive refractive power, a diaphragm, and a rear unit of a positive refractive power,
wherein the front unit includes, in order from the object side to the image side, a positive lens L11, a positive lens L12, and a negative lens L13,
wherein the rear unit includes, in order from the object side to the image side, a negative lens L21, a positive lens L22, and a positive lens L23,
wherein an air lens with a convex surface on the image side is formed between the negative lens L21 and the positive lens L22, and
wherein the following conditional expressions are satisfied:

$$1.00 < fF/fR < 2.00$$

$$1.00 < f22/f$$

$$(R2b+R1b)/(R2b-R1b) < -0.10$$

$$0.30 < BF/f < 0.60$$

where fF is a focal length of the front unit, fR is a focal length of the rear unit, f22 is a focal length of the positive lens L22, f is a focal length of the optical system, R1b is a radius of curvature of a surface on the image side of the negative lens L21, R2b is a radius of curvature a surface on the object side of the positive lens L22, and BF is a distance from a lens surface closest to an image plane in the optical system to the image plane on an optical axis.

* * * * *